United States Patent [19]

Jenkins, III et al.

[11] 3,956,929

[45] May 18, 1976

[54] APPARATUS FOR TESTING POWER TRANSMISSION BELTS

[75] Inventors: George H. Jenkins, III, Littleton; Raymond C. Dykstra, Boulder, both of Colo.

[73] Assignee: The Gates Rubber Company, Denver, Colo.

[22] Filed: Aug. 15, 1975

[21] Appl. No.: 601,902

[52] U.S. Cl............................... 73/133 R; 73/162
[51] Int. Cl.²...................................... G01M 13/02
[58] Field of Search............... 73/88 R, 133 R, 162, 73/134, 91

[56] References Cited

UNITED STATES PATENTS 3,739,632   6/1973   Miller et al. ........................ 73/162

*Primary Examiner*—Charles A. Ruehl
*Attorney, Agent, or Firm*—H. W. Oberg, Jr.; Raymond Fink; Curtis H. Castleman, Jr.

[57] ABSTRACT

Testing apparatus including a fixed shaft and a floating shaft with means for moving it selectively generally parallel to the fixed shaft, two pulleys on each shaft paired and aligned between shafts and wherein one of the pulleys is the selectively variable diameter type.

22 Claims, 4 Drawing Figures

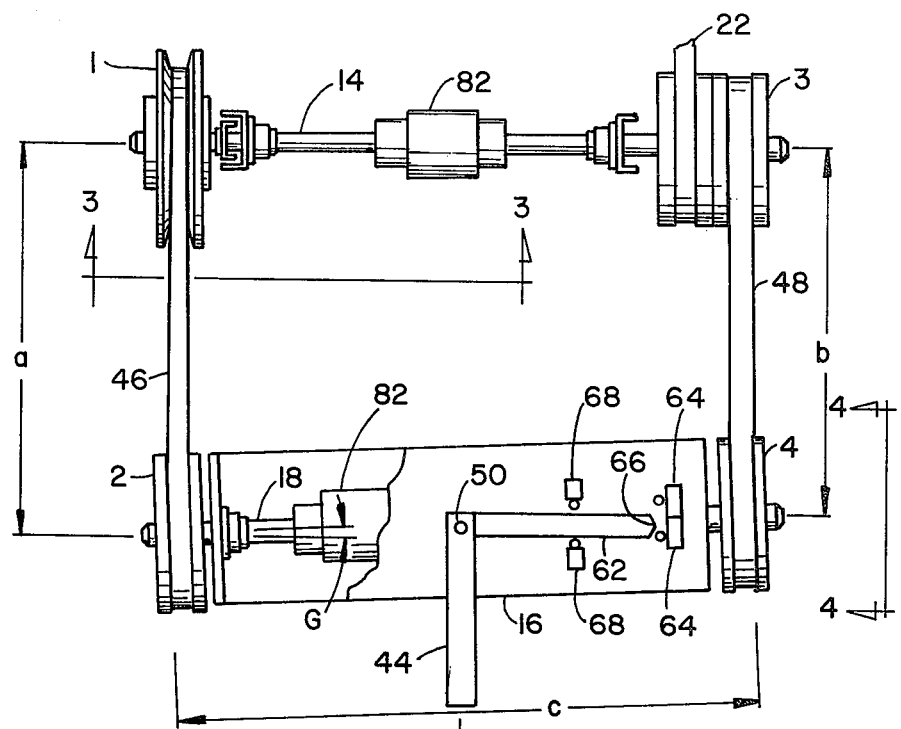
FIG. 2
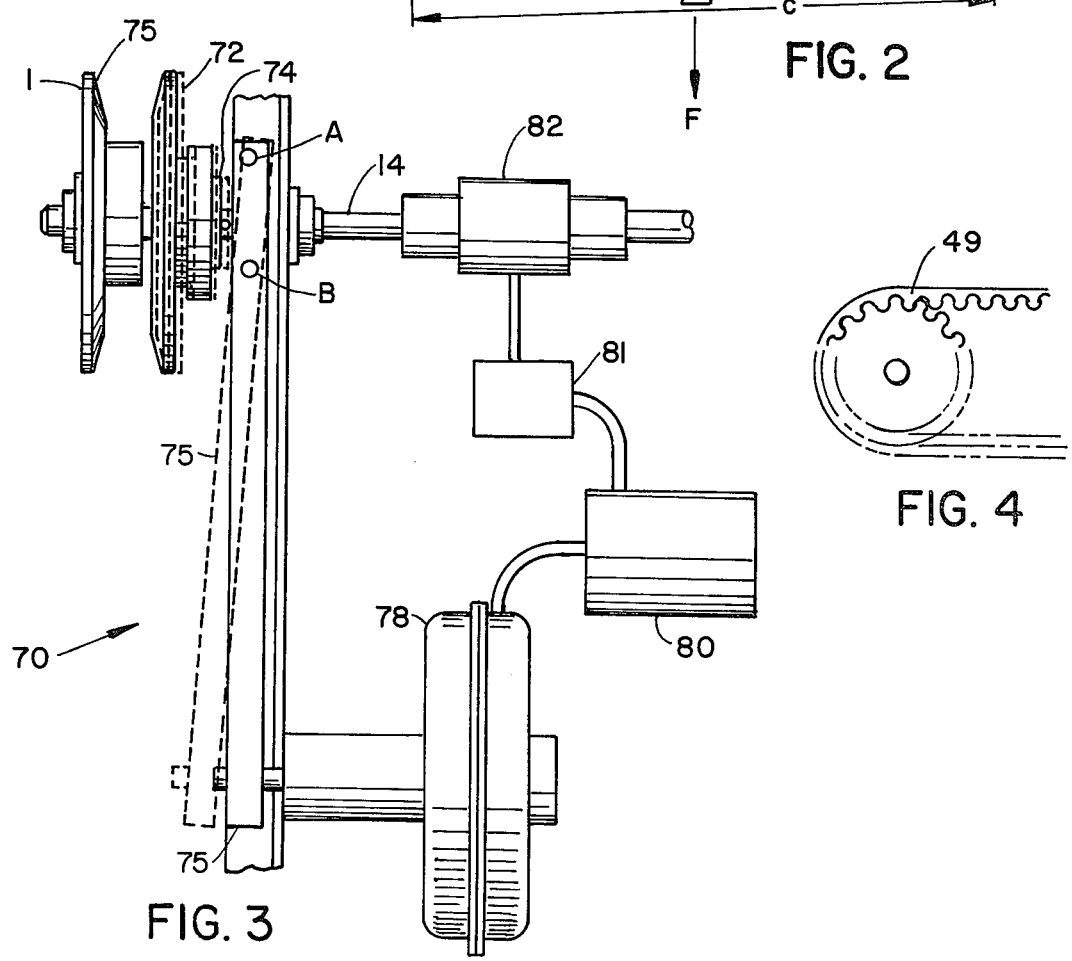
FIG. 3
FIG. 4

APPARATUS FOR TESTING POWER TRANSMISSION BELTS

BACKGROUND OF THE INVENTION

The invention relates to measuring and testing torque using a dynamometer with a rotating torque responsive element, but more particularly, the invention relates to apparatus for dynamically testing power transmission belts.

Four-square testing apparatus is used to determine the dynamic effect of horsepower and torque on power transmission components. In such apparatus, power is recirculated between two rotating shafts. The advantage of such drives is that input power is quite small compared to the power absorbed in the recirculating system. The input power need make up only for power losses of the system.

Preload torque in known quantity is easily introduced in apparatus where the shafts are mechanically interlocked with positive rotational devices such as gears. Starting with parallel shafts mechanically interconnected with spur gears, one shaft may be rotationally displaced from the other to preload a known torque in the two shafts. Rotation of either shaft by external means causes the preload torque to be dynamically recirculated between the two rotating shafts. While such apparatus is satisfactory for testing power transmission components where the shafts are mechanically interlocked, the apparatus is unsatisfactory for testing power transmission components where mechanical interlocking of the two shafts cannot be obtained. The apparatus is unsatisfactory for testing components which transmit power by means of friction. This is because the statically introduced torque is easily lost at the friction surfaces, leaving no preload for power recirculation.

In a type of four-square apparatus, it is known to have two parallel shafts with two pulleys of different diameters mounted on each shaft. The pulleys are arranged so the large pulley of one shaft is aligned with the smaller pulley of the other shaft. The difference in pulley diameters is chosen for a predetermined speed ratio. Two V-belts are arranged over the pulleys and preloaded. One shaft is rotated. The difference in speed ratio causes power to recirculate between the belts. A problem associated with such a device is that of determining the tension in each belt. This is because belts typically stretch and wear down in width during their normal service life and they are built with circumferential tolerances. While the torque between two belts could be measured, their contribution and their share of a recirculating horsepower load is indeterminate because of the unknown tensions. Also, the torque arising from a given ratio cannot be predicted ahead of time because of variations in belt transverse and longitudinal elastic characteristics.

Another problem with such a device is that the speed ratio between shafts is fixed. Only one horsepower/torque level may be tested at a time. The pulleys must be removed and changed with different diameter pulleys to effect different points of horsepower and torque.

A solution of the problem of separating known quantities of tension and torque in a V-belt test apparatus is presented in Canadian Pat. No. 963,690 to Miller et al. (U.S. Pat. No. 3,739,632). First and second shafts are coaxially arranged and tied together through a torque applicator. The torque applicator may be in the form of a hydraulic motor or other mechanism that imparts relative rotation between the coaxial shafts. Third and fourth shafts are spaced from and arranged parallel to the first and second shafts. The third and fourth shafts are parallelly displaced from each other within the confines of a device known as a "Schmidt" coupling. Pulleys are arranged at the free ends of the shafts and V-belts are arranged over the pulleys. One shaft is rotated while the torque applicator imparts relative rotation between the shafts. The problem associated with this type of device is that four shafts must be used with complicated interconnecting devices which consume power and space.

SUMMARY OF THE INVENTION

In accordance with the invention, belt testing apparatus is provided that includes substantially parallel fixed and floating shafts with pulleys attached to their ends. One pulley is selectively variable in pitch diameter. An adjustable idler pulley is arranged in alignment between the variable pitch pulley and its companion pulley. Belts are arranged over the pulleys.

The floating shaft is mounted in a carriage which allows planar rotation and translation of the floating shaft in relation to the fixed shaft. Means are provided to change the effective pitch diameter of the variable pitch pulley in response to the torque of at least one of the shafts.

An advantage of the system is that secondary means are not required to impart coaxial differential rotation of either of the shafts.

Another advantage of the system is that torque and belt tension are individually established so that belt transmitted horsepower can be readily determined.

Still another advantage of the invention is that belts may be tested to complete or partial failure.

These and other objects or advantages of the invention will be apparent after reviewing the drawings and description thereof wherein:

FIG. 2 is a top view showing essential components of the invention broken away.

FIG. 3 shows components broken away from and looking generally along the lines 3—3 of FIG. 2.

FIG. 4 is a partial view taken along the lines 4—4 of FIG. 2 showing an alternate form of the invention.

TECHNICAL DISCLOSURE

Figure 1:
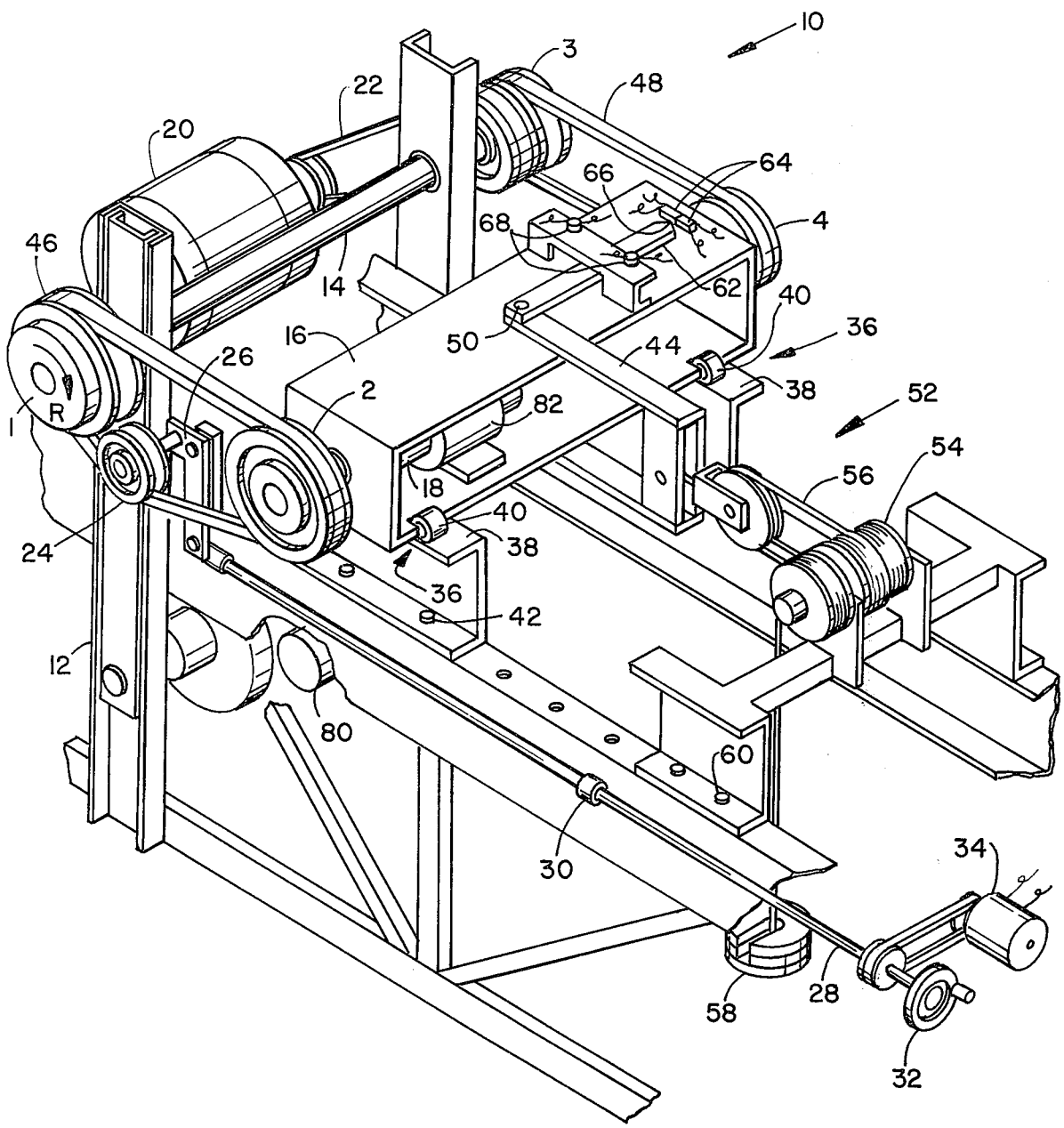
FIG. 1 is a partially cutaway isometric view showing the apparatus of the invention.

Referring generally to the Figures, apparatus 10 for testing power transmission belts is provided that includes a frame means 12 which supports a first rotatably mounted or "fixed" shaft 14 and a movable carriage 16 which supports a second rotatable or "floating" shaft 18. Pulleys 1, 2, 3, and 4 are secured to the ends of each shaft and arranged so that respective pulleys 1–2, 3–4 between shafts are aligned with each other. At least one pulley 1 is of the selectively variable pitch type. Preferably, the variable pitch pulley is secured to one end of the fixed shaft 14. Means, such as a motor 20 and power transmission belt 22, are provided to rotate at least one of the shafts. It is preferred that the fixed shaft 14 receives rotational power for drive simplicity.

A take-up idler pulley 24 is arranged between the variable speed pulley and its corresponding or paired pulley. The idler pulley is articulately mounted from the frame member. For example, the articulation of the pulley may be provided by means such as a pivotal lever 26 that is moved arcuately by means of a threaded lag screw 28 and nut 30. The screw may be manually turned with a crank 32 or automatically turned such as by means of a step or gear motor 34.

The carriage 16 is adapted to permit axial movement of the floating shaft 18 in a plane that is substantially parallel and more preferably coplanar with the axis of the first shaft 14.

The carriage is free to move in a plane so the floating shaft may translate from and rotate (yaw) relative to the driven shaft. Ways 36 are provided on the frame member to permit the translation and rotation. The ways may include two substantially flat hardened surfaces 38 mounted to the frame and cylindrical rollers 40 mounted to the carriage. The rollers and flat surfaces permit planar translation and yaw rotation of the carriage. Optionally, the flat surfaces may be adjustable along the length of the frame member with fasteners 42 to permit testing of various length power transmission belts. Of course, other mechanisms (e.g., articulated levers) may be used to replace the flat surfaces and cylindrical rollers to define ways that limit carriage movement.

A clevis 44 is attached to the carriage as a means for translating the carriage to preload the power transmission belts. The belt riding in the variable pitch pulley may be conveniently referred to as the control belt 46 and the second belt may be referred to as the test belt 48. A clevis pin 50 preferably attaches to the carriage so that extraneous forces (i.e., forces other than translation and rotation) are not introduced to the carriage and consequently, the floating shaft 18. This is done by keeping the pin axis (1) perpendicular to and intersecting the floating shaft axis; and (2) perpendicular to the plane of the ways.

When the clevis is attached to intersect the midpoint of the floating shaft, the carriage translation forces are equally shared by the control belt 46 and test belt 48. However, it may be desirable in some testing applications to attach the clevis pin 50 at various points across the carriage to selectively distribute the carriage translation forces between the two power transmission belts. The forces are split between the pulleys 2, 4 of the floating shaft in an inversely proportional relationship that depends on the distance of the pulleys 2, 4 from the clevis pin 50.

A pulling mechanism 52 attaches to the clevis for translating the carriage. The mechanism may be any known means such such as air or hydraulic cylinders, levered weights, or the like. One such mechanism is a differential windlass 54.

One pulley of the windlass is attached to the clevis with pins. The cables 56 of the windlass are substantially parallel to the plane of ways so that forces other than translation and rotation are not introduced to the carriage. Weights 58 are added to torque the windlass to effect a desired translation force F. The differential size of the windlass pulleys are selected for a desired mechanical advantage. For example, the differential size may yield a mechanical advantage of 16 to 1. With this arrangement, one ounce added to the weight system is magnified to a 1 pound pull.

Optionally, the pulling mechanism is mounted to move longitudinally along the frame for adjustment to different belt lengths. This is easily done with fasteners 60 such as nuts and bolts.

An alignment indicator may be included between the yoke and carriage to aid in aligning the floating shaft to the fixed shaft. A switch actuator 62 is attached to move with one leg of the clevis. The switch actuator preferably extends from the clevis to near one end of the carriage for maximum sensitivity. Electrical sensors such as micro-switches 64 are affixed to the carriage a predetermined distance from the switch actuator. The switch actuator may be beveled 66 at its end to affect sensitivity between the micro-switches and switch actuator. Additional switches, such as shut-down switches 68, may also be affixed to the carriage and activated by the switch activator.

The variable pitch pulley is controlled to a desired effective pitch diameter such as with a lever mechanism 70 that gives precise control. One pulley half 72 of the variable pitch pulley is free to move axially on the fixed shaft against a thrust bearing 74 while the other pulley half 75 is secured to the fixed shaft. An actuating lever 76 abuts the thrust bearing to provide axial movement. One end of a lever 75 is reciprocally moved by means such as an actuator 78. The actuator may be of the diaphragm type with force actuation in one direction and a return spring in the other direction. The lever is fulcrumed to give a desired translation relative to the stroke of the actuator. The lever may be fulcrumed to give either left or right movement at the thrust bearing responsive to a power stroke of the actuator. When the fulcrum point is at A, the power stroke of the actuator to the left moves the thrust bearing to the left. If the fulcrum point is changed to B, the power stroke of the actuator to the left permits the thrust bearing to move to the right. The location of the fulcrum is chosen so that during operation, the idler pulley remains on the slack side of the belt.

An electropneumatic transducer 80 may be conveniently used to control the pressure to the diaphragm actuator and effect a force that is a function of an electrical signal. The signal of the electropneumatic transducer may be compared by known electrical means 81 to effect a closed servo loop for testing to the signal of a torque meter 82 adapted to either one or both shafts 14, 8.

The life of a V-belt is significantly affected by pulley diameter. As a general rule, a 14 percent change in pulley diameter has a two to one effect on belt life. For example, increasing pulley diameter 14 percent approximately doubles V-belt life whereas a 14 percent decrease in pulley diameter halves V-belt life. The control belt is preferably a V-belt, but the test belt may be either a toothed belt 49, flat belt, round belt, a V-belt or the like. It is desirable to have the variable pitch pulley 1 and its respectively aligned pulley 2 of larger diameter than the pulleys of the other belt to yield longer belt life.

In a V-belt drive system, power is transmitted between driver and driven pulleys as the V-belt wedges into the pulley groove. On the driver pulley the belt enters the pulley under high tension at a radius that is less than that radius where it exits the driver pulley. Conversely, the belt enters the driven pulley under low tension at a relative high radius, exiting at a lower radius. This movement of the belt in the pulleys effects a speed ratio between driver and driven shafts which is different from the speed ratio obtained by proportioning the pitch diameters of the driver and driven pulleys. The change in speed ratio during normal power transmission between driver and driven pulleys is known as belt creep. Thus, for a given power transmission there will be expected creep. Should the power being transmitted cause the tension ratio in the belts to become too high, there will be an increased speed ratio change between the driver and driven shaft. The speed ratio change that is significantly greater than that required to normally transmit the load is commonly referred to as belt slip. Obviously, different belts with different coefficients of friction or different transverse and longitudinal elastic properties will have different transitions between creep and slip. Normally, belt creep does not exceed 1½ percent but may go as high as 5 percent. Of course, there is an indeterminable area in belt operation during the transient condition between belt creep and belt slip. Assuming that a 5 percent belt creep and slip condition would be a maximum situation in testing power transmission belts, there could be a 5 percent speed variation between pulley 1 and pulley 2 and another 5 percent speed variation between pulley 3 and pulley 4. For effective recirculating power provision to exist for a large variety of belts, the variable pitch diameter pulley is designed to effect a speed ratio variation of 10 percent. Not all of the speed ratio change need be accommodated by the variable pitch pulley. The pulley diameters may be slightly varied to approximate the speed ratio change that occurs when operating at a desired torque level. For example, pulley 1 may be smaller than pulley 2, and pulley 3 larger than pulley 4. For a total required speed ratio change of 4 percent the speed ratioed pulleys may make up 2 percent of the required speed ratio change while the variable pitch pulley may make up only 1 to 2 percent of the speed ratio to achieve the desired change level of recirculating power.

In operation, belts 46, 48 are arranged over their respective pulleys. It has been found desirable to have the control belt 2 to 5 inches longer than that of the test belt.

Weights are added to the differential windlass to achieve a desired preload in the belts. When the clevis 44 is at the mid-point of the floating shaft 18, the load is equally distributed between the test and control belts. A 2,000 pound load at the clevis is reacted by 1,000 pounds at the pulleys of the floating shaft. Accordingly, the tension in each strand of the test belt will be 500 pounds.

The idler pulley 24 is moved until the fixed and floating shafts are substantially parallel. A rough adjustment may be quickly made by measuring the center distance between the two shafts and then either manually or automatically turning the lag screw which activates the articulated mechanism of the idler pulley. Parallelism between the fixed shaft and floating shaft is easily determinable. The parallelism may be expressed by the relationship:

$$\sin G = (a-b)/c$$

or:

$$a - b = c \sin G$$

Accordingly, if $c$ equals 35.375 inches and $G$ equals ¼°, $a$ minus $b$ equals 0.154 inches. When the micro-switches 64 are set to allow plus or minus 0.154 inch between $a$ and $b$, then the alignment is within plus or minus ¼°. The micro-switches may be used to signal operation of the step motor 34 to automatically position the idler pulley to reestablish parallelism of the fixed and floating shafts.

Indicator means such as lights may be connected to the micro-switches 64 to visually indicate the parallelism of the shafts.

Belts of different sizes and lengths and construction will have different stretch characteristics. Most V-type power transmission belts are designed with certain stretch characteristics. It may be necessary to run the belts for a few hours to make sure that the belts are properly seated in the pulley grooves and that all stretching has taken place. During this time period, it may be necessary for manual or automatic adjustment of the idler pulley.

The alignment indicator mechanism insures that the floating shaft is substantially parallel to the fixed shaft within operating limits. For most V-belt applications, an angular alignment of generally ¼° or less is satisfactory. It has been found that once the belts have been run in, very little adjustment, if any, is needed in the idler pulley. However, adjustment may be made either manually or automatically by means of the step motor 34 with an associated feedback system.

Typically, a belt fails in stages. The belt begins to cause rough running which induces the floating shaft to oscillate. A shut-off micro-switch 68 set at 2° may be used as a maximum limit for carriage movement. The apparatus is automatically turned off when the shut-down switch 68 is activated. It has been found that the apparatus offers a salient feature in that the test belt may be examined at different stages of failure. This is accomplished merely by controlling the amount of angular tolerance of the microswitches 68. ½°, or preferably a ¼° tolerance is satisfactory for alignment and 2° is satisfactory for automatic shutdown.

The direction of rotation of the fixed shaft by the drive motor is a factor that must be considered when establishing the operation of the idler on the slack side of the control belt. This is because belt life may be significantly reduced when an idler is operated on the tension side. Thus, the top side of the control belt should be the high tension side and correspondingly, the bottom side of the test belt should be the low tension side.

The variable pitch pulley 1 is the driven pulley, assuming a clockwise rotation R. Pulley number 2 then becomes a driver, pulley number 3 a driven, and pulley number 4 a driver. The torque meter 82 on the floating shaft 18 measures the torque output of the test belt. The effective pitch diameter of the variable pitch pulley must be reduced to effect a torque increase of the test belt. To achieve this, the fulcrum of the lever is positioned at point B allowing the variable pulley to open. Torque is precisely controlled through the servo mechanism. When a torque increase is required, a signal is given to the electropneumatic transducer which controls supply of pressure to the actuator. The signal to the electropneumatic transducer is compared by known means 81 to the signal of the torque meter. Once the signals are balanced, constant air pressure is maintained in the actuator.

In some situations it may be desirable for the variable pitch pulley to rotate counter clockwise. When this is done, the top of a control belt 46 remains as the tight side while the bottom of the test belt 48 remains as the tight side. Pulley 1 becomes a driver pulley, pulley 2 a driven pulley, pulley 4 a driver pulley, and pulley 3 a driven pulley. To make up for creep in the system, the variable pitch pulley closes which increases its effective pitch diameter. The variable pitch pulley is closed when fulcrum point A is used. The torque meter on the fixed shaft measures output torque of the test belt. A torque meter on the floating shaft then measures input torque to the test belt.

Horsepower carried by the test belt is easily calculated from the following formula:

$HP = 2\pi MT/33,000$ where:

$N$ = revolution per minute
$M$ = *measured torque, ft. - lbs.*
H.P. = horsepower The total tension in the test belt is known from the preload established by the weights. The tension in the belt strands is commonly referred to as $T_1 + T_2$. The difference in tension between belt strands is $T_1 - T_2$ and is calculated from the torque measured by the torque meters and the pulley diameters. This may be expressed by the formula:

$T_1 - T_2 = 2 M/D$ where:

$D$ = pulley diameter, ft.

The details of the electropneumatic transducer, the torque meter, micro-switches, and comparator, for the signals, have not been included because they are readily available components. However, the following parameters give an example of apparatus capable of testing belts at 50 horsepower with no more than a 5 horsepower test motor.

| | |
|---|---|
| Pulley 1 Diameter | 8.5 inches + or − 10% |
| Pulley 2 Diameter | 8.5 inches |
| Pulley 3 Diameter | 7.1 inch |
| Pulley 4 Diameter | 7.1 inch |
| Drive Motor | 5 HP, 1740 rpm |
| Torque Meter | 0 to 2,000 in/lbs. |
| Diaphragm actuator | 4.5 to 26 psi, 2 inch stroke |
| Electropneumatic transducer | 1 to 5 milliamps, DC input, 6 to 30 psig output |

The foregoing detailed description is offered for purpose of illustration only and is not intended to limit the scope of the invention which is to be determined from the appended claims.

What is claimed is:

1. Apparatus for testing power transmission belts comprising:
   a first rotatably mounted shaft with at least two pulleys attached;
   a second rotatably mounted shaft translatably spaced from and substantially parallel with the first shaft, the second shaft with at least two pulleys that are substantially longitudinally aligned with the pulleys of the first shaft to define test and control pulley pairs and wherein at least one of the pulleys of the control pair is a variable pitch pulley;
   means for rotating one of the shafts;
   means for selectively varying the pitch diameter of the variable pitch pulley;
   means for translating the second shaft in relation to the first shaft; and
   means for adjusting the second shaft to substantially parallel alignment with the first shaft.

2. The apparatus of claim 1 comprising:
   a movable carriage which mounts the second shaft;
   a clevis pivotally attached to the carriage so the pivot axis of the clevis is substantially perpendicular to the axis of the second shaft;
   means for pulling the clevis to translate the carriage away from the first shaft, the carriage, clevis and pulling means constituting the translating means.

3. The apparatus of claim 2 comprising a cable attached to the clevis and selectively removable weights attached to the cable, the weights and cable constituting the pulling means.

4. The apparatus of claim 3 comprising a differential windlass around which the cable is wound in such a manner to give a mechanical advantage between weights and clevis.

5. The apparatus of claim 2 comprising a plurality of cylindraceous wheels attached to and supporting the carriage from generally flat surfaces of a frame member of the apparatus, the wheels and flat surfaces defining ways.

6. The apparatus of claim 2 comprising:
   switch means attached to the carriage; and
   switch activation means attached to the clevis;
   whereby rotation of the clevis in relation to the carriage activates the switch means.

7. The apparatus of claim 6 comprising:
   an idler pulley aligned and operational with the variable pitch pulley and its paired pulley;
   means for selectively laterally displacing the idler pulley; and
   means for receiving the signal of the switch activation means and activating the lateral displacing means to laterally displace the idler pulley.

8. The apparatus of claim 2 wherein the clevis pivot axis is substantially midway between the pulleys of the second shaft.

9. The apparatus of claim 1 comprising at least one torque meter coaxially connected between pulleys of at least one shaft.

10. The apparatus of claim 1, the adjusting means comprising:
    an idler pulley aligned and operational with the variable pitch pulley and its paired pulley; and
    means for selectively laterally displacing the idler pulley.

11. The apparatus of claim 10 wherein a test belt is entrained around the test pulleys and a control belt is entrained around the idler and control pulleys.

12. The apparatus of claim 1 comprising:
    a first pulley half;
    a second pulley half coaxially movable to and from the first pulley half, the first and second pulley halves constituting the variable pitch pulley;
    a levered yoke engaging the second pulley half for axially moving the second pulley half;
    means for selectively and reciprocally actuating the levered yoke, the actuating means and levered yoke constituting the varying means.

13. The apparatus of claim 12 and further comprising:
    at least one torque meter coaxially connected between pulleys of at least one shaft;
    means for generating a signal responsive to torque levels measured by the torque meter; and
    means responsive to the torque signal for generating a signal that selectively activates the levered yoke activating means to change the effective diameter of the variable speed pulley.

14. The apparatus of claim 12 wherein the reciprocal actuating means is an air cylinder.

15. The apparatus of claim 1 wherein at least one pair of pulleys are toothed.

16. The apparatus of claim 1 wherein the control pair of pulleys have larger diameters than the test pair of pulleys.

17. The apparatus of claim 1 wherein the second shaft is aligned within ½° of the first shaft.

18. A method for testing power transmission belts under dynamic conditions using a driven shaft with pulleys at each end and a substantially parallel drive shaft with pulleys at each end that are aligned with the respective pulleys of the driven shaft comprising the steps of:
arranging a test belt over corresponding pulleys of the drive and driven shafts;
arranging a control belt over the pulleys of the drive and driven shaft and a correspondingly aligned idler pulley;
translating the driven shaft substantially planarly away from the drive shaft effecting preloading of the test and control belts;
substantially planarly rotating the driven shaft to be substantially parallel with the drive shaft by means of laterally displacing the idler pulley;
rotating the driven shaft; and
varying the pitch diameter of at least one pulley of the drive shaft, effecting a desired torque load carried by the belts.

19. The method of claim 18 including measuring directly the torque on at least one of the shafts.

20. The method of claim 19 including selectively varying the pitch diameter of the variable pitch pulley in response to the measured torque.

21. The method of claim 18 including automatically translating the idler pulley in response to the planar angular position of the driven shaft.

22. Apparatus for testing power transmission belts comprising:
a fixed shaft with a fixed diameter pulley at one end and a variable pitch pulley at the other end;
means for selectively changing the pitch diameter of the variable pitch pulley;
a floating shaft with fixed diameter pulleys at each end, the driven shaft arranged substantially parallel to the fixed shaft, and the pulleys at each end aligned with the respective pulleys of the fixed shaft;
an idler pulley aligned with the variable pitch pulley disposed between the drive and driven shafts;
means for measuring torque between pulleys of at least one of said shafts;
a control belt arranged over the variable pitch pulley, idler pulley and respectively aligned pulley of the floating shaft;
a test belt arranged over the respectively aligned pulley of the driver and driven shafts;
means for translating the floating shaft substantially planarly away from the drive shaft to preload the control and test belts;
means for substantially planarly rotating the axis of the floating shaft;
means for radially displacing the idler pulley against the control belt and effecting planar rotation of the axis of the floating shaft to have it substantially parallel with the axis of the fixed shaft;
means for rotating the fixed shaft; and
frame means for supporting the fixed shaft, floating shaft, idler pulley displacing means, translating means, and planar rotation means.

* * * * *